United States Patent
Pointner et al.

(10) Patent No.: US 11,772,967 B2
(45) Date of Patent: Oct. 3, 2023

(54) INTEGRATED PROCESSES FOR TREATMENT OF AN AMMONIUM FLUOROSULFATE BYPRODUCT OF THE PRODUCTION OF BIS (FLUOROSULFONYL) IMIDE

(71) Applicant: Honeywell International Inc., Charlotte, NC (US)

(72) Inventors: Bernard E. Pointner, Buffalo, NY (US); Matthew H. Luly, Hamburg, NY (US); James V. Guiheen, Madison, NJ (US); Brian Leone, Morris Plains, NJ (US)

(73) Assignee: Honeywell International Inc., Charlotte, NC (US)

( * ) Notice: Subject to any disclaimer, the term of this patent is extended or adjusted under 35 U.S.C. 154(b) by 117 days.

(21) Appl. No.: 17/554,977

(22) Filed: Dec. 17, 2021

(65) Prior Publication Data
US 2022/0212929 A1    Jul. 7, 2022

Related U.S. Application Data

(60) Provisional application No. 63/134,883, filed on Jan. 7, 2021.

(51) Int. Cl.
*C01B 7/19* (2006.01)
*C01C 1/246* (2006.01)
(Continued)

(52) U.S. Cl.
CPC .............. *C01B 7/191* (2013.01); *C01B 7/196* (2013.01); *C01C 1/028* (2013.01); *C01C 1/162* (2013.01);
(Continued)

(58) Field of Classification Search
CPC ......... C01B 7/191; C01B 7/196; C01C 1/246; C01C 1/028; C01C 1/162; C01C 1/28;
(Continued)

(56) References Cited

U.S. PATENT DOCUMENTS

| 4,086,419 A | 4/1978 | Tessler |
| 8,337,797 B2 | 12/2012 | Honda et al. |

(Continued)

FOREIGN PATENT DOCUMENTS

| CN | 102341343 A | 2/2012 |
| CN | 107986248 A | 5/2018 |

(Continued)

OTHER PUBLICATIONS

Jones et al., "Kinetics Of Decomposition Of The Fluorosulphate Ion In Aqueous Solution", Journal of Inorganic and Nuclear Chemistry, vol. 30, No. 5, 1968, pp. 1237-1243.

(Continued)

*Primary Examiner* — Timothy C Vanoy
(74) *Attorney, Agent, or Firm* — Faegre Drinker Biddle & Reath LLP (57) ABSTRACT

A process for treating an ammonium fluorosulfate byproduct includes providing an ammonium fluorosulfate byproduct including primarily ammonium fluorosulfate and lesser amounts of fluorosulfonic acid and bis(fluorosulfonyl) imide, mixing the ammonium fluorosulfate byproduct with water, reacting the mixture of the ammonium fluorosulfate byproduct and the water at a hydrolysis reaction temperature to hydrolyze the ammonium fluorosulfate, the fluorosulfonic acid and the bis(fluorosulfonyl) imide to form ammonium bisulfate and aqueous hydrogen fluoride; and separating the ammonium bisulfate from the aqueous hydrogen fluoride.

14 Claims, 2 Drawing Sheets

(51) Int. Cl.
    *C01D 3/02*     (2006.01)
    *C01C 1/28*     (2006.01)
    *C01D 5/08*     (2006.01)
    *C01F 11/22*     (2006.01)
    *C01F 11/46*     (2006.01)
    *C01C 1/16*     (2006.01)
    *C01C 1/02*     (2006.01)

(52) U.S. Cl.
    CPC ............... *C01C 1/246* (2013.01); *C01C 1/28* (2013.01); *C01D 3/02* (2013.01); *C01D 5/08* (2013.01); *C01F 11/22* (2013.01); *C01F 11/46* (2013.01)

(58) Field of Classification Search
    CPC ... C01D 3/02; C01D 5/08; C01F 11/22; C01F 11/46
    See application file for complete search history.

(56) References Cited

U.S. PATENT DOCUMENTS

| | | | |
|---|---|---|---|
| 8,377,406 | B1 | 2/2013 | Singh et al. |
| 8,580,220 | B2 | 11/2013 | Honda et al. |
| 8,722,005 | B1 | 5/2014 | Poshusta et al. |
| 9,156,692 | B2 | 10/2015 | Honda et al. |
| 9,181,173 | B2 | 11/2015 | Johnson |
| 9,242,862 | B2 | 1/2016 | Tsubokura et al. |
| 9,475,764 | B2 | 10/2016 | Johnson |
| 10,734,664 | B1 | 8/2020 | Singh et al. |
| 2014/0037529 | A1 | 2/2014 | Honda et al. |
| 2016/0308247 | A1 | 10/2016 | Buisine |

FOREIGN PATENT DOCUMENTS

| | | |
|---|---|---|
| CN | 108975292 A | 12/2018 |
| CN | 109264682 A | 1/2019 |
| CN | 109264683 A | 1/2019 |
| CN | 109592655 A | 4/2019 |
| CN | 110436424 A | 11/2019 |
| CN | 112340713 A | 2/2021 |
| EP | 2660196 A1 | 11/2013 |
| JP | 5444453 B2 | 3/2014 |
| JP | 2014-105115 A | 6/2014 |
| JP | 5560136 B2 | 7/2014 |
| KR | 10-1687374 B1 | 12/2016 |
| WO | 2011/111780 A1 | 9/2011 |

OTHER PUBLICATIONS

International Search Report and Written Opinion received for PCT Patent Application No. PCT/US2022/070021, dated Apr. 22, 2022, 11 pages.

INTEGRATED PROCESSES FOR TREATMENT OF AN AMMONIUM FLUOROSULFATE BYPRODUCT OF THE PRODUCTION OF BIS (FLUOROSULFONYL) IMIDE

CROSS-REFERENCE TO RELATED APPLICATION

This application claims priority to Provisional Application No. 63/134,883, filed Jan. 7, 2021, which is herein incorporated by reference in its entirety.

FIELD

The present disclosure relates to processes for treating an ammonium fluorosulfate byproduct. Specifically, the present disclosure relates to integrated processes for treating an ammonium fluorosulfate byproduct of the production of bis(fluorosulfonyl) imide.

BACKGROUND

Bis(fluorosulfonyl) imide (HFSI) is a key raw material in the production of lithium bis(fluorosulfonyl) imide (LiFSI), which is used in lithium ion batteries. HFSI ($HN(SO_2F)_2$) can be prepared by several methods. For example, HFSI can be prepared by the reaction of urea ($CO(NH_2)_2$) with fluorosulfonic acid ($HSO_3F$) shown in Equation 1.

$$5HSO_3F + 2CO(NH_2)_2 \rightarrow HN(SO_2F)_2 + 2CO_2 + 3NH_4SO_3F. \qquad \text{Eq. 1}$$

U.S. Pat. No. 8,337,797 to Honda et al. discloses a two-step batch process for producing HFSI from urea and fluorosulfonic acid. In the first step, the urea is dissolved in the fluorosulfonic acid at a temperature low enough to prevent the reaction of Equation 1 between the urea and the fluorosulfonic acid. In the second step, the urea/fluorosulfonic acid solution is slowly added to separate reaction vessel including a reaction medium heated sufficiently for the reaction of Equation 1 to proceed. The batch process as disclosed in U.S. Pat. No. 8,337,797 is not sufficient for producing HFSI on an efficient, commercial scale.

International publication WO 2011/111780, also to Honda et al., further discloses a recovery process to continuously remove reaction liquid from the reaction vessel, such as through an overflow outlet, continuously discharging the reaction liquid in a slurry state (including the ammonium fluorosulfate byproduct). The process disclosed is done in production batches, with product HFSI added back to the reaction vessel ahead of the reaction for the next production batch.

Thus, there is a need to develop a more efficient process that may be scaled to produce commercial quantities of HFSI.

SUMMARY

The present disclosure provides integrated processes for treating ammonium fluorosulfate produced as a byproduct in the production of bis(fluorosulfonyl) imide.

In one embodiment, the present invention provides a process for treating an ammonium fluorosulfate byproduct. The process comprises providing an ammonium fluorosulfate byproduct including primarily ammonium fluorosulfate and lesser amounts of fluorosulfonic acid and bis(fluorosulfonyl) imide; mixing the ammonium fluorosulfate byproduct with water; reacting the mixture of the ammonium fluorosulfate byproduct and the water at a hydrolysis reaction temperature to hydrolyze the ammonium fluorosulfate, the fluorosulfonic acid and the bis(fluorosulfonyl) imide to form ammonium bisulfate and aqueous hydrogen fluoride; and separating the ammonium bisulfate from the aqueous hydrogen fluoride.

In another embodiment, the present invention provides a process for treating an ammonium fluorosulfate byproduct. The process comprises providing an ammonium fluorosulfate byproduct including primarily ammonium fluorosulfate and lesser amounts of fluorosulfonic acid and bis(fluorosulfonyl) imide; mixing the ammonium fluorosulfate byproduct with water and a base; and reacting the mixture of the ammonium fluorosulfate byproduct with the water and the base at a hydrolysis reaction temperature to hydrolyze and neutralize the ammonium fluorosulfate, the fluorosulfonic acid and the bis(fluorosulfonyl) imide to form a mixture comprising a fluoride, a sulfate and ammonium bisulfate.

The above mentioned and other features of the disclosure, and the manner of attaining them, will become more apparent and will be better understood by reference to the following description of embodiments taken in conjunction with the accompanying drawings.

DETAILED DESCRIPTION

The present disclosure provides integrated processes which may be scaled to treat an ammonium fluorosulfate byproduct formed in the production of commercial quantities of bis(fluorosulfonyl) imide (HFSI). The HFSI can be produced by the reaction of urea and fluorosulfonic acid (FSA), as described above in Equation 1. The ammonium fluorosulfate byproduct formed in such production of HFSI includes primarily ammonium fluorosulfate ($NH_4SO_3F$) and smaller amounts of HFSI and FSA. After concentrating the HFSI, the resulting ammonium fluorosulfate byproduct is typically a solid, but may also be in the form of slurry of ammonium fluorosulfate and residual HFSI and FSA. The ammonium fluorosulfate byproduct is a potentially hazardous material that is water reactive, producing hydrofluoric acid. Disposing of the hazardous ammonium fluorosulfate byproduct can be dangerous and expensive, limiting the overall efficiency of HFSI production.

The present invention provides integrated processes for efficiently treating the ammonium fluorosulfate byproduct to improve the overall efficiency of HFSI production. Treating the ammonium fluorosulfate byproduct as disclosed herein can result in environmentally friendly waste products and/or commercially useful byproducts.

As disclosed herein, the HFSI is produced from a solution of urea and fluorosulfonic acid. The solution of urea and fluorosulfonic acid is formed by mixing the urea and the fluorosulfonic acid together. The solution of urea and fluorosulfonic acid is added to a reaction medium at a reaction temperature to react the fluorosulfonic acid and the urea to produce a crude product including HFSI, as well as ammonium fluorosulfate, as shown in Equation 1. The carbon dioxide gas produced may be vented or captured for other uses. The reaction medium can include fluorosulfonic acid and may further include HFSI.

The reaction temperature may be as low as about 80° C., about 90° C., about 100° C., about 110° C., or about 120° C., or as high as about 130° C., about 140° C., about 150° C., about 160° C. or about 170° C., or within any range defined between any two of the foregoing values, such as about 80° C. to about 170° C., about 90° C. to about 160° C., about 100° C. to about 150° C., about 110° C. to about 140° C., about 120° C. to about 130° C., about 130° C. to about 150° C., or about 110° C. to about 120° C., for example. Preferably, the reaction temperature is from about 110° C. to about 140° C. More preferably, the reaction temperature is from about 120° C. to about 140° C. Most preferably, the reaction temperature is from about 120° C. to about 130° C.

The crude product is separated into an intermediate product and an ammonium fluorosulfate byproduct. The crude product may be separated into the intermediate product and the ammonium fluorosulfate byproduct by vacuum drying, evaporation, spray drying, filtration, or any combination thereof, for example.

The intermediate product is separated into a concentrated product and an FSA recycle product. The concentrated product includes a higher concentration of the HFSI than the FSA recycle product. In some embodiments, the FSA recycle product is recycled back to the reaction medium. In some embodiments, the FSA recycle product may alternatively, or additionally, be directed to a storage tank for later use. The separation may be by distillation, for example.

The ammonium fluorosulfate byproduct includes primarily ammonium fluorosulfate and lesser amounts of HFSI and FSA. As used herein, the term "primarily" means greater than or equal to 50 weight percent (wt. %) of the byproduct. The ammonium fluorosulfate byproduct is typically a solid, but may also be in the form of slurry of ammonium fluorosulfate and residual HFSI and FSA.

The concentration of ammonium fluorosulfate in the ammonium fluorosulfate byproduct may be as low as 50 wt. %, 60 wt. %, 70 wt. %, 80 wt. %, 85 wt. %, 87 wt. %, 90 wt. %, 92 wt. %, 94 wt. % or 95 wt. %, or as high as 95.5 wt. %, 96 wt. %, 96.5 wt. %, 97 wt. %, 97.5 wt. %, 98 wt. %, 98.5 wt. %, 99 wt. %, 99.5 wt. % or 99.9 wt. %, or be within any range defined between any two of the foregoing values, such as 50 wt. % to 99.9 wt. %, 60 wt. % to 99.5 wt. %, 70 wt. % to 99 wt. %, 80 wt. % to 98.5 wt. %, 85 wt. % to 98 wt. %, 87 wt. % to 97.5 wt. %, 90 wt. % to 97 wt. %, 92 wt. % to 96.5 wt. %, 94 wt. % to 96 wt. %, 95 wt. % to 95.5 wt. %, 50 wt. % to 95 wt. %, 90 wt. % to 99.9 wt. %, 95 wt. % to 99.9 wt. %, or 98 wt. % to 99.5 wt. %, for example.

In some embodiments, the ammonium fluorosulfate byproduct stream may be treated by mixing the ammonium fluorosulfate byproduct with water, and then reacting the ammonium fluorosulfate byproduct and water at a hydrolysis reaction temperature to hydrolyze the ammonium fluorosulfate, the FSA and the HFSI to form a mixture of ammonium bisulfate ($NH_4HSO_4$), aqueous hydrogen fluoride (HF) and sulfuric acid ($H_2SO_4$) according to Equations 2-4:

$$NH_4SO_3F + H_2O \rightarrow NH_4HSO_4 + HF, \quad \text{Eq. 3}$$

$$HSO_3F + H_2O \rightarrow H_2SO_4 + HF, \quad \text{Eq. 3}$$

$$HN(SO_2F)_2 + 4H_2O \rightarrow NH_4HSO_4 + 2HF + H_2SO_4. \quad \text{Eq. 4}$$

The hydrolysis reaction temperature may be as low as about 20° C., about 25° C., about 30° C., about 35° C., about 40° C., about 45° C. or about 50° C., or as high as about 60° C., about 70° C., about 80° C., about 90° C., about 100° C., about 150° C. or about 200° C., or within any range defined between any two of the foregoing values, such as about 20° C. to about 200° C., about 25° C. to about 150° C., about 30° C. to about 100° C., about 35° C. to about 90° C., about 40° C. to about 80° C., about 45° C. to about 70° C., about 50° C. to about 60° C., about 35° C. to about 90° C., about 40° C. to about 80° C., about 20° C. to about 100° C., or about 60° C. to about 80° C., for example. Preferably, the reaction temperature is from about 25° C. to about 80° C. More preferably, the reaction temperature is from about 30° C. to about 70° C. Most preferably, the reaction temperature is from about 40° C. to about 60° C. At temperatures exceeding about 100° C., the hydrolysis reaction will be above atmospheric pressure.

The ammonium bisulfate mixture is separated from the aqueous HF by vacuum drying, evaporation, spray drying, or any combination thereof, for example. The ammonium bisulfate mixture is then neutralized with ammonia, which converts the sulfuric acid to additional ammonium bisulfate according to Equation 5:

$$H_2SO_4 + NH_3 \rightarrow NH_4HSO_4. \quad \text{Eq. 5}$$

The neutralized ammonium bisulfate may be dried by vacuum drying, evaporation, spray drying, or any combination thereof, for example. The neutralized ammonium bisulfate may be used in other reactions, or may be suitable for sale and use in applications requiring a weak acid, for example. Alternatively, the ammonium bisulfate can be reacted with additional ammonia to produce ammonium sulfate, according to Equation 6:

$$NH_4HSO_4 + NH_3 \rightarrow (NH_4)_2SO_4. \quad \text{Eq. 6}$$

The ammonium sulfate may be dried by vacuum drying, evaporation, spray drying, or any combination thereof, for example. The resulting solid ammonium sulfate may be suitable for sale and use as a fertilizer, for example.

Water in the aqueous HF may be separated from the aqueous HF to produce concentrated aqueous HF. The water may be separated by distillation, pressure swing distillation and/or diffusion dialysis, as is known in the art. The concentrated aqueous HF may be stored as it is a valuable raw material in numerous industrial processes. The water removed is preferably recycled to the step of hydrolyzing the ammonium fluorosulfate byproduct. Alternatively, or additionally, the water may be treated as wastewater.

In some embodiments, the concentrated aqueous HF may be concentrated to form anhydrous hydrogen fluoride. The term "anhydrous hydrogen fluoride" means hydrogen fluoride that is substantially free of water. That is, any water in the anhydrous hydrogen fluoride is in an amount by weight less that about 500 ppm, about 300 ppm, about 200 ppm, about 100 ppm, about 50 ppm, about 30 ppm, about 20 ppm, about 10 ppm, about 5 ppm, about 3 ppm, about 2 ppm, or about 1 ppm, or less than any value defined between any two of the foregoing values. Preferably, the anhydrous hydrogen fluoride comprises water by weight in an amount less than about 100 ppm. More preferably, the anhydrous hydrogen fluoride comprises water by weight in an amount less than about 10 ppm. Most preferably, the anhydrous hydrogen fluoride comprises water by weight in an amount less than about 1 ppm.

In some other embodiments, the ammonium fluorosulfate byproduct stream may be treated by mixing the ammonium fluorosulfate byproduct with water and a base. The base is not particularly limited. For clarity, the description below uses calcium hydroxide, but it is understood that embodiments can include the use of sodium hydroxide, potassium hydroxide or ammonium hydroxide, for example.

The ammonium fluorosulfate byproduct, the water and the base (calcium hydroxide) are reacted at a reaction temperature to hydrolyze and neutralize the ammonium fluorosulfate, the FSA and the HFSI to form ammonia and mixture comprising calcium fluoride, calcium sulfate, ammonium bisulfate and ammonium sulfate according to Equations 2-4 and 6-9 (below):

$$NH_4SO_3F + H_2O \rightarrow NH_4HSO_4 + HF, \quad \text{Eq. 2}$$

$$HSO_3F + H_2O \rightarrow H_2SO_4 + HF, \quad \text{Eq. 3}$$

$$HN(SO_2F)_2 + 4H_2O \rightarrow NH_4HSO_4 + 2HF + H_2SO_4, \quad \text{Eq. 4}$$

$$NH_4HSO_4 + NH_3 \rightarrow (NH_4)_2SO_4, \quad \text{Eq. 6}$$

$$2HF + Ca(OH)_2 \rightarrow CaF_2 + 2H_2O, \quad \text{Eq. 7}$$

$$NH_4HSO_4 + Ca(OH)_2 \rightarrow CaSO_4 + 2H_2O + NH_3, \quad \text{Eq. 8}$$

$$H_2SO_4 + Ca(OH)_2 \rightarrow CaSO_4 + 2H_2O. \quad \text{Eq. 9}$$

Some of the ammonia released by the conversion of ammonium bisulfate to calcium sulfate (Equation 8) may result in the conversion of some ammonium bisulfate to ammonium sulfate (Equation 6). Any ammonia not consumed may be treated by an acid scrubber, as is known in the art.

The hydrolysis reaction temperature may be as low as about 20° C., about 25° C., about 30° C., about 35° C., about 40° C., about 45° C. or about 50° C., or as high as about 60° C., about 70° C., about 80° C., about 90° C., about 100° C., about 150° C. or about 200° C., or within any range defined between any two of the foregoing values, such as about 20° C. to about 200° C., about 25° C. to about 150° C., about 30° C. to about 100° C., about 35° C. to about 90° C., about 40° C. to about 80° C., about 45° C. to about 70° C., about 50° C. to about 60° C., about 35° C. to about 90° C., about 40° C. to about 80° C., about 20° C. to about 100° C., or about 60° C. to about 80° C., for example. Preferably, the reaction temperature is from about 25° C. to about 80° C. More preferably, the reaction temperature is from about 30° C. to about 70° C. Most preferably, the reaction temperature is from about 40° C. to about 60° C. At temperatures exceeding about 100° C., the hydrolysis reaction will be above atmospheric pressure.

The mixture comprising calcium fluoride, calcium sulfate, ammonium bisulfate may be safely deposited in a landfill. Alternatively, the compounds may be separated for further use. For example, the calcium fluoride may be used in making hydrogen fluoride or for use as optical lenses or windows. The calcium sulfate may be used as a soil conditioner or a cement additive, for example. The ammonium sulfate may be used as a fertilizer, as previously mentioned. The ammonium bisulfate may be used in other reactions, or may be suitable for sale and use in applications requiring a weak acid, for example. Alternatively, the ammonium bisulfate may be treated with ammonia, as described above in reference to Equation 6, to produce additional ammonium sulfate.

In some embodiments, the processes described above are continuous processes. In some other embodiments, the processes described above are semi-batch. By semi-batch, it is meant that while significant portions of the process are continuous, the entire process is not continuous. For example, in some semi-batch embodiments, the crude product may be produced and stored in continuous fashion for some period of time, and then at a later time, the stored crude product may be processed through the separation steps to separate the ammonium fluorosulfate byproduct from the crude product to produce the intermediate product and the recycle product in a continuous fashion, with the intermediate product and the recycle product stored for later use and the ammonium fluorosulfate byproduct stored for later treatment according to any of the processes described above.

Figure 1:
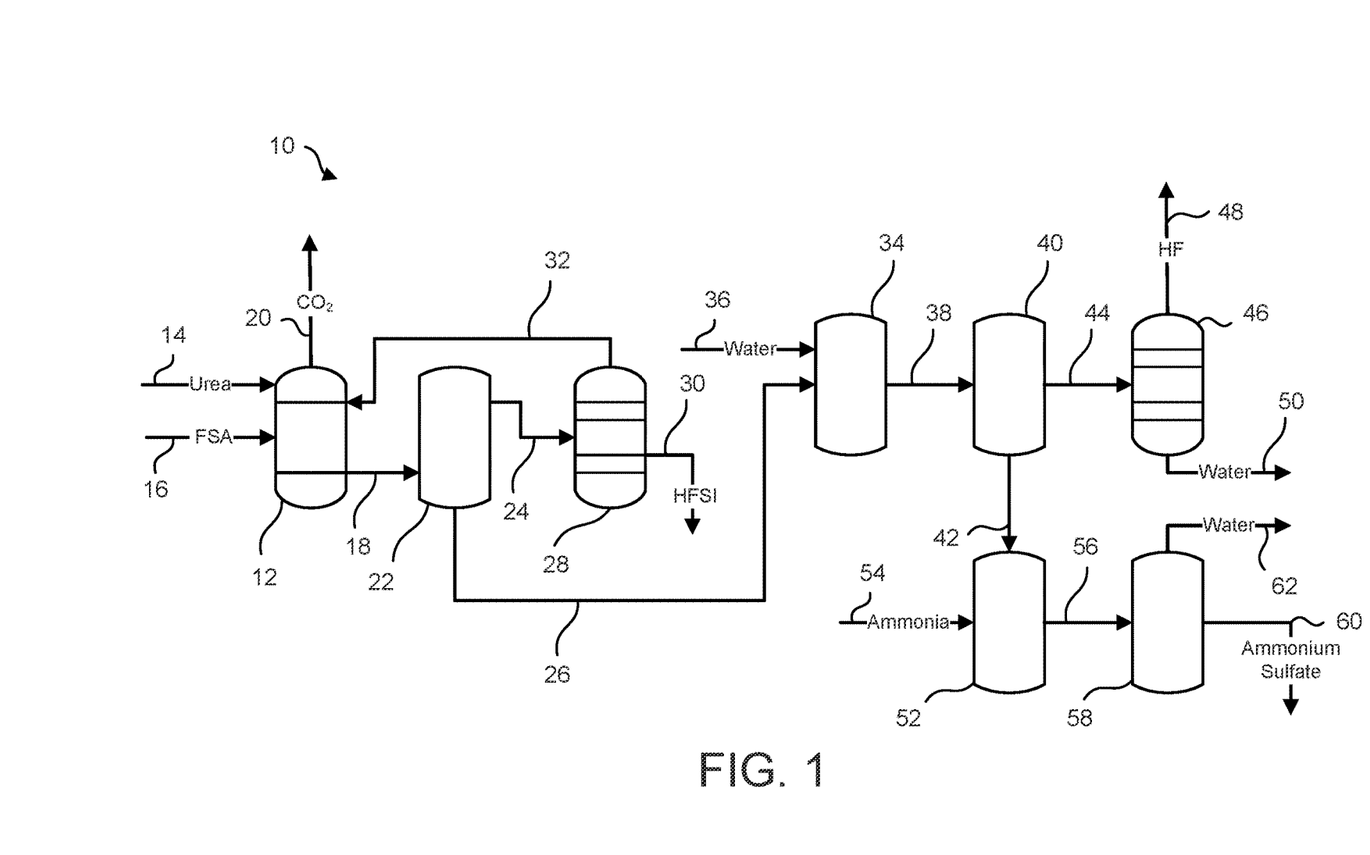
FIG. 1 is a process flow diagram showing an integrated process for the continuous treatment of an ammonium fluorosulfate byproduct formed in the production of bis (fluorosulfonyl) imide, according to some embodiments of this disclosure.

FIG. 1 is a process flow diagram showing an integrated process 10 for the continuous treatment of an ammonium fluorosulfate byproduct formed in the production of bis (fluorosulfonyl) imide, according to some embodiments of this disclosure. As shown in FIG. 1, the process 10 includes a reactor 12 configured to connect to a urea input stream 14 and a fluorosulfonic acid input stream 16. Fluorosulfonic acid in the first fluorosulfonic acid input stream 16 is in liquid form and may be continuously pumped into the reactor 12. Alternatively, the fluorosulfonic acid in the fluorosulfonic acid input stream 16 may be added as a batch. Urea in the urea input stream 14 is in solid form and may be continuously provided to the reactor 12 by a solid conveying system (not shown), for example. Alternatively, the urea in the input stream 14 may be added to the reactor 12 as a batch.

The reactor 12 can include a reaction medium to which the urea and the fluorosulfonic acid is added. The reaction medium may include fluorosulfonic acid. The mixture of urea, fluorosulfonic acid and the reaction medium within the reactor 12 is heated to a reaction temperature, as described above, to produce a crude product stream 18 including HFSI according to the reaction of Equation 1. The carbon dioxide may be vented from the reactor 12 through a reactor vent 20. The vented carbon dioxide may be vented to atmosphere or collected for subsequent use. The reactor 12 is configured to maintain the reaction temperature by way of a fluid flowing through a heat exchanger or jacketed reactor (not shown), or by an electric heating coil (not shown), for example. In this way, the reactor 12 is configured to produce the crude product stream 18 including HFSI, ammonium fluorosulfate, and fluorosulfonic acid.

The crude product stream 18 fluidly connects the reactor 12 to a first separator 22. The first separator 22 is configured to separate the ammonium fluorosulfate from the crude product stream 18 to produce an intermediate product stream 24 and an ammonium fluorosulfate byproduct stream 26. The first separator 22 can be an evaporator, a vacuum dryer, a spray drier, a filter, a centrifuge, or any combination thereof, for example.

The intermediate product stream 24 fluidly connects the first separator 22 to a second separator 28. The second separator 28 is configured to produce a concentrated product stream 30 and a recycle stream 32. The second separator 28 can be a distillation column, for example. The concentrated product stream 30 includes a concentration of HFSI that is greater than a concentration of HFSI in the recycle stream 32. The recycle stream 32 is fluidly coupled to the reactor 12. Alternatively, or additionally, the recycle stream 32 may be fluidly coupled to a reaction medium recycle storage tank (not shown). The recycle stream 32 can be directed to the reactor 12 for continuous operation, or to the reaction medium recycle storage tank for semi-batch operation at a later time.

In the embodiment shown in FIG. 1, the ammonium fluorosulfate byproduct stream 26 fluidly connects the first separator 22 to a hydrolysis tank 34 where the ammonium fluorosulfate byproduct is mixed with water provided by a water input stream 36. The mixture of the ammonium fluorosulfate byproduct and the water within the hydrolysis tank 34 is heated to a hydrolysis reaction temperature, as described above, to hydrolyze the ammonium fluorosulfate, the FSA and the HFSI to form an intermediate byproduct stream 38 including ammonium bisulfate and aqueous hydrogen fluoride, according to the reactions of Equations 2-4 above.

The hydrolysis tank 34 is configured to maintain the hydrolysis reaction temperature by way of a fluid flowing through a heat exchanger or jacketed reactor (not shown), or by an electric heating coil (not shown), for example. In this way, the hydrolysis tank 34 is configured to produce the intermediate byproduct stream 38 including ammonium bisulfate and aqueous hydrogen fluoride.

The intermediate byproduct stream 38 fluidly connects the hydrolysis tank 34 to a byproduct separator 40. The byproduct separator 40 is configured to separate the ammonium bisulfate from the aqueous hydrogen fluoride to produce an ammonium bisulfate stream 42 and an aqueous hydrogen fluoride stream 44. The byproduct separator 40 may be an evaporator, a vacuum dryer, a spray drier, a filter, a centrifuge, or any combination thereof, for example. Alternatively, in some embodiments, the hydrolysis tank 34 and the byproduct separator 40 may be combined into a single unit.

The aqueous hydrogen fluoride stream 44 fluidly connects the byproduct separator 40 to an HF concentrator 46. The HF concentrator 46 is configured to separate the water from the aqueous hydrogen fluoride to form a concentrated hydrogen fluoride stream 48 and a wastewater stream 50. The HF concentrator 46 may be a pressure swing distillation system including a pair of distillation columns, for example. The concentrated hydrogen fluoride from the concentrated hydrogen fluoride stream 48 may be stored or supplied to another process requiring concentrated hydrogen fluoride. The wastewater stream 50 may be recycled (not shown) to the hydrolysis tank 34 or may be directed to a wastewater treatment facility (not shown).

The ammonium bisulfate stream 42 fluidly connects the byproduct separator 40 to a neutralization tank 52 where the ammonium bisulfate is mixed with ammonia provided by an ammonia input stream 54. The ammonia reacts with the ammonium bisulfate to form an ammonium sulfate stream 56 including ammonium sulfate, according to the reaction of Equation 5 above. The ammonium sulfate is an aqueous ammonium sulfate.

The ammonium sulfate stream 56 fluidly connects the neutralization tank 52 to ammonium sulfate dryer/concentrator 58. The ammonium sulfate dryer/concentrator 58 separates water from the aqueous ammonium sulfate to produce a concentrated ammonium sulfate stream 60 and a wastewater stream 62. The ammonium sulfate dryer/concentrator 58 may be an evaporator, a vacuum dryer, a spray drier, a filter, a centrifuge, or any combination thereof, for example. The concentrated ammonium sulfate in the concentrated ammonium sulfate stream 60 may be suitable for sale and use as a fertilizer, for example. In some embodiments, the concentrated ammonium sulfate may be in solid form. The wastewater stream 62 may be recycled (not shown) to the hydrolysis tank 34 or may be directed to a wastewater treatment facility (not shown).

Thus, the integrated process 10 shown in FIG. 1 provides an integrated process for efficiently treating the ammonium fluorosulfate byproduct to improve the overall efficiency of HFSI production. Treating the ammonium fluorosulfate byproduct as described in FIG. 1 provides commercially useful byproducts and/or environmentally friendly waste products.

Figure 2:
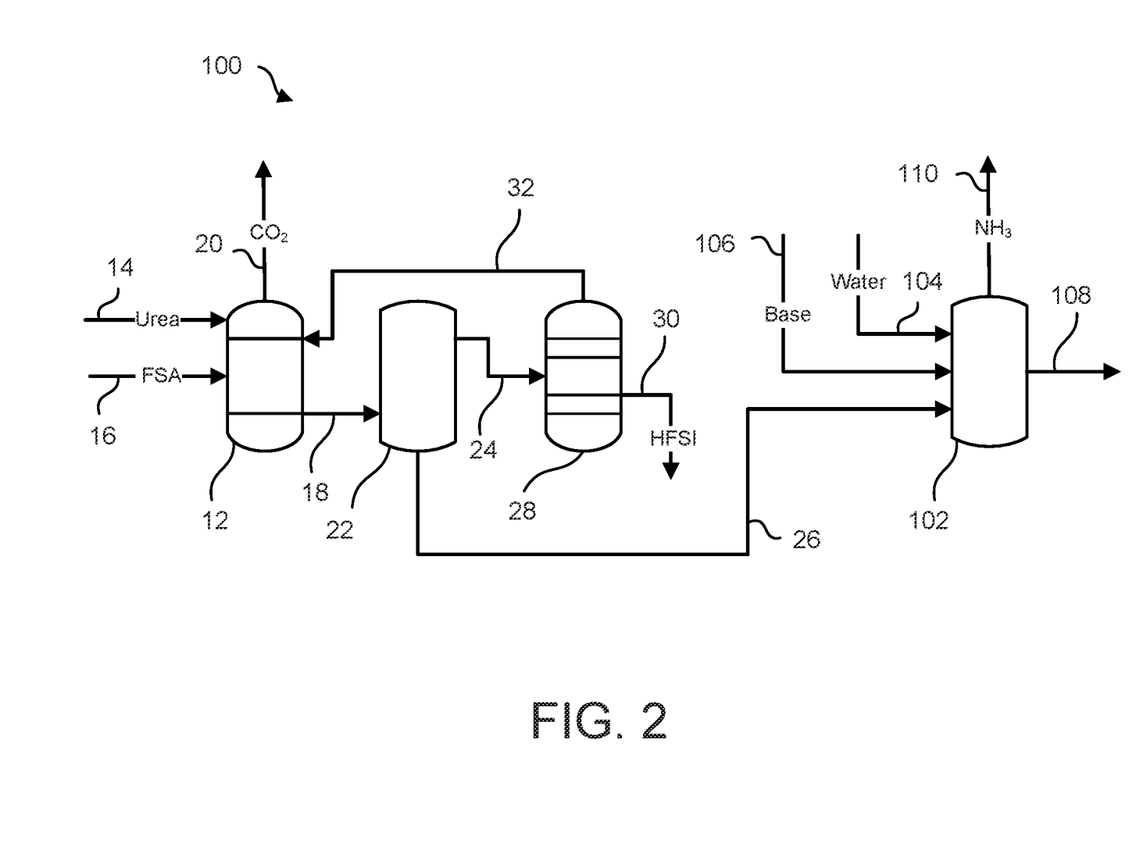
FIG. 2 is a process flow diagram showing another an integrated process for the continuous treatment of an ammonium fluorosulfate byproduct formed in the production of bis(fluorosulfonyl) imide, according to some embodiments of this disclosure.

FIG. 2 is a process flow diagram showing another integrated process 100 for the continuous treatment of an ammonium fluorosulfate byproduct formed in the production of bis(fluorosulfonyl) imide, according to some embodiments of this disclosure. As shown in FIG. 2, the process 100 includes a reactor 12 configured to connect to a urea input stream 14 and a fluorosulfonic acid input stream 16. Fluorosulfonic acid in the first fluorosulfonic acid input stream 16 is in liquid form and may be continuously pumped into the reactor 12. Alternatively, the fluorosulfonic acid in the fluorosulfonic acid input stream 16 may be added as a batch. Urea in the urea input stream 14 is in solid form and may be continuously provided to the reactor 12 by a solid conveying system (not shown), for example. Alternatively, the urea in the input stream 14 may be added to the reactor 12 as a batch.

The reactor 12 can include a reaction medium to which the urea and the fluorosulfonic acid is added. The reaction medium may include fluorosulfonic acid. The mixture of urea, fluorosulfonic acid and the reaction medium within the reactor 12 is heated to a reaction temperature, as described above, to produce a crude product stream 18 including HFSI according to the reaction of Equation 1. The carbon dioxide may be vented from the reactor 12 through a reactor vent 20. The reactor 12 is configured to maintain the reaction temperature by way of a fluid flowing through a heat exchanger or jacketed reactor (not shown), or by an electric heating coil (not shown), for example. In this way, the reactor 12 is configured to produce the crude product stream 18 including HFSI, ammonium fluorosulfate, and fluorosulfonic acid.

The crude product stream 18 fluidly connects the reactor 12 to a first separator 22. The first separator 22 is configured to separate the ammonium fluorosulfate from the crude product stream 18 to produce an intermediate product stream 24 and an ammonium fluorosulfate byproduct stream 26. The first separator 22 can be an evaporator, a vacuum dryer, a spray drier, a filter, a centrifuge, or any combination thereof, for example.

The intermediate product stream 24 fluidly connects the first separator 22 to a second separator 28. The second separator 28 is configured to produce a concentrated product stream 30 and a recycle stream 32. The second separator 28 can be a distillation column, for example. The concentrated product stream 30 includes a concentration of HFSI that is greater than a concentration of HFSI in the recycle stream 32. The recycle stream 32 is fluidly coupled to the reactor 12. Alternatively, or additionally, the recycle stream 32 may be fluidly coupled to a reaction medium recycle storage tank (not shown). The recycle stream 32 can be directed to the reactor 12 for continuous operation, or to the reaction medium recycle storage tank for semi-batch operation at a later time.

In the embodiment shown in FIG. 2, the ammonium fluorosulfate byproduct stream 26 fluidly connects the first separator 22 to a hydrolysis/neutralization tank 102 where the ammonium fluorosulfate byproduct is mixed with water provided by a water input stream 104 and with calcium hydroxide provided by a calcium hydroxide input stream 106. The mixture of the ammonium fluorosulfate byproduct, the water and the calcium hydroxide within the hydrolysis neutralization tank 102 is heated to a hydrolysis reaction temperature, as described above, to hydrolyze and neutralize the ammonium fluorosulfate, the FSA and the HFSI to form a waste stream 108 including calcium fluoride, calcium sulfate, ammonium sulfate and ammonium bisulfate according to the reactions of Equations 2-4 and 6-9 above, and a vent 110. Any ammonia in the vent 110 may be directed to a scrubber (not shown) for neutralization, as is known in the art.

The waste stream 108 comprising only environmentally acceptable waste products may be economically deposited in a landfill. Alternately, the waste stream 108 may be separated for further use, as described above. Thus, the integrated process 100 shown in FIG. 2 provides an integrated process for efficiently treating the ammonium fluorosulfate byproduct to improve the overall efficiency of HFSI production. Treating the ammonium fluorosulfate byproduct as described in FIG. 2 provides commercially useful byproducts and/or environmentally friendly waste products.

The systems 10 of FIG. 1 and the system 100 of FIG. 2 may be operated a continuous mode or in a semi-batch mode.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value. As used herein, the singular forms "a", "an" and "the" include plural unless the context clearly dictates otherwise.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

ASPECTS

Aspect 1 is a process for treating an ammonium fluorosulfate byproduct. The process includes providing an ammonium fluorosulfate byproduct including primarily ammonium fluorosulfate and lesser amounts of fluorosulfonic acid and bis(fluorosulfonyl) imide; mixing the ammonium fluorosulfate byproduct with water; reacting the mixture of the ammonium fluorosulfate byproduct and the water at a hydrolysis reaction temperature to hydrolyze the ammonium fluorosulfate, the fluorosulfonic acid and the bis(fluorosulfonyl) imide to form ammonium bisulfate and aqueous hydrogen fluoride; and separating the ammonium bisulfate from the aqueous hydrogen fluoride.

Aspect 2 is the process of Aspect 1, further including separating the water from the aqueous hydrogen fluoride to form concentrated hydrogen fluoride.

Aspect 3 is the process of Aspect 2, wherein separating the water from the aqueous hydrogen fluoride to form concentrated hydrogen fluoride includes pressure swing distillation.

Aspect 4 is the process of Aspect 2 or Aspect 3, wherein the concentrated hydrogen fluoride is anhydrous hydrogen fluoride.

Aspect 5 is the process of any of Aspects 1-4, wherein a concentration of the ammonium fluorosulfate in the ammonium fluorosulfate byproduct is from 50 wt. % to 99.9 wt. % of the ammonium fluorosulfate byproduct.

Aspect 6 is the process of any of Aspects 1-4, wherein a concentration of the ammonium fluorosulfate in the ammonium fluorosulfate byproduct is from 90 wt. % to 99.9 wt. % of the ammonium fluorosulfate byproduct.

Aspect 7 is the process of any of Aspects 1-6, wherein the ammonium fluorosulfate byproduct consists essentially of ammonium fluorosulfate, fluorosulfonic acid and bis(fluorosulfonyl) imide.

Aspect 8 is the process of any of Aspects 1-7, wherein the hydrolysis reaction temperature is from about 20° C. to about 200° C.

Aspect 9 is the process of any of Aspects 1-7, wherein the hydrolysis reaction temperature is from about 40° C. to about 60° C.

Aspect 10 is the process of any of Aspects 1-9, wherein separating the ammonium bisulfate from the aqueous hydrogen fluoride includes vacuum drying.

Aspect 11 is the process of any of Aspects 1-10, further including reacting the ammonium bisulfate with ammonia to form ammonium sulfate.

Aspect 12 is the process of Aspect 11, further including drying the ammonium sulfate.

Aspect 13 is the process of any of Aspects 1-12, wherein the process is a continuous process.

Aspect 14 is the process of any of Aspects 1-12, wherein the process is a semi-batch process.

Aspect 15 is the process of any of Aspects 1-14, wherein the process is an integrated process further including: providing a solution comprising fluorosulfonic acid and urea; reacting the solution comprising fluorosulfonic acid and urea at a reaction temperature from 80° C. to about 170° C. to produce a crude product including bis(fluorosulfonyl) imide, fluorosulfonic acid, and ammonium fluorosulfate; separating the ammonium fluorosulfate from the crude product to produce an intermediate product having a greater concentration of bis(fluorosulfonyl) imide than the crude product and the ammonium fluorosulfate byproduct, the ammonium fluorosulfate byproduct having a greater concentration of ammonium fluorosulfate than the crude product; and separating the intermediate product into a concentrated product and a recycle product, the concentrated product including a higher concentration of bis(fluorosulfonyl) imide than the recycle product.

Aspect 16 is the process of Aspect 15, further including recycling the recycle product back to the step of reacting the solution comprising fluorosulfonic acid and urea.

Aspect 17 is the process of Aspect 15 or Aspect 16, wherein separating the intermediate product into the concentrated product and the recycle product includes distilling the intermediate product.

Aspect 18 is a process for treating an ammonium fluorosulfate byproduct. The process includes: providing an ammonium fluorosulfate byproduct including primarily ammonium fluorosulfate and lesser amounts of fluorosulfonic acid and bis(fluorosulfonyl) imide; mixing the ammonium fluorosulfate byproduct with water and a base; and reacting the mixture of the ammonium fluorosulfate byproduct with the water and the base at a hydrolysis reaction temperature to hydrolyze and neutralize the ammonium fluorosulfate, the fluorosulfonic acid and the bis(fluorosulfonyl) imide to form a mixture comprising a fluoride, a sulfate and ammonium bisulfate.

Aspect 19 is the process of Aspect 18, wherein reacting the mixture of the ammonium fluorosulfate byproduct with the water and the base also forms ammonia.

Aspect 20 is the process of Aspect 18 or Aspect 19, wherein the base includes calcium hydroxide, the fluoride formed includes calcium fluoride and the sulfate formed includes calcium sulfate.

Aspect 21 includes the process of Aspect 18 or Aspect 19, wherein the base includes sodium hydroxide, the fluoride formed includes sodium fluoride and the sulfate formed includes sodium sulfate.

Aspect 22 includes the process of Aspect 18 or Aspect 19, wherein the base includes potassium hydroxide, the fluoride formed includes potassium fluoride and the sulfate formed includes potassium sulfate.

Aspect 23 includes the process of Aspect 18 or Aspect 19, wherein the base includes ammonium hydroxide, the fluoride formed includes ammonium fluoride and the sulfate formed includes ammonium sulfate.

Aspect 24 is the process of any of Aspects 18-23, wherein a concentration of the ammonium fluorosulfate in the ammonium fluorosulfate byproduct is from 50 wt. % to 99.9 wt. % of the ammonium fluorosulfate byproduct.

Aspect 25 is the process of any of Aspects 18-23, wherein a concentration of the ammonium fluorosulfate in the ammonium fluorosulfate byproduct is from 90 wt. % to 99.9 wt. % of the ammonium fluorosulfate byproduct.

Aspect 26 is the process of any of Aspects 18-25, wherein the ammonium fluorosulfate byproduct consists essentially of ammonium fluorosulfate, fluorosulfonic acid and bis(fluorosulfonyl) imide.

Aspect 27 is the process of any of Aspects 18-26, wherein the hydrolysis reaction temperature is from about 20° C. to about 200° C.

Aspect 28 is the process of any of Aspects 18-26, wherein the hydrolysis reaction temperature is from about 40° C. to about 60° C.

Aspect 29 is the process of any of Aspects 18-28, wherein the process is a continuous process.

Aspect 30 is the process of any of Aspects 18-28, wherein the process is a semi-batch process.

Aspect 31 is the process of any of Aspects 18-30, wherein the process is an integrated process further including: providing a solution comprising fluorosulfonic acid and urea; reacting the solution comprising fluorosulfonic acid and urea at a reaction temperature from 80° C. to about 170° C. to produce a crude product including bis(fluorosulfonyl) imide, fluorosulfonic acid, and ammonium fluorosulfate; separating the ammonium fluorosulfate from the crude product to produce an intermediate product having a greater concentration of bis(fluorosulfonyl) imide than the crude product and the ammonium fluorosulfate byproduct, the ammonium fluorosulfate byproduct having a greater concentration of ammonium fluorosulfate than the crude product; and separating the intermediate product into a concentrated product and a recycle product, the concentrated product including a higher concentration of bis(fluorosulfonyl) imide than the recycle product.

Aspect 32 is the process of Aspect 31, further including recycling the recycle product back to the step of reacting the solution comprising fluorosulfonic acid and urea.

Aspect 33 is the process of Aspect 31 or Aspect 32, wherein separating the intermediate product into the concentrated product and the recycle product includes distilling the intermediate product.

The invention claimed is:

1. A process for treating an ammonium fluorosulfate byproduct, the process comprising:
   providing an ammonium fluorosulfate byproduct including primarily ammonium fluorosulfate and lesser amounts of fluorosulfonic acid and bis(fluorosulfonyl) imide;
   mixing the ammonium fluorosulfate byproduct with water;
   reacting the mixture of the ammonium fluorosulfate byproduct and the water at a hydrolysis reaction temperature to hydrolyze the ammonium fluorosulfate, the fluorosulfonic acid and the bis(fluorosulfonyl) imide to form ammonium bisulfate and aqueous hydrogen fluoride; and
   separating the ammonium bisulfate from the aqueous hydrogen fluoride.

2. The process of claim 1, further comprising separating the water from the aqueous hydrogen fluoride to form concentrated hydrogen fluoride.

3. The process of claim 2, wherein separating the water from the aqueous hydrogen fluoride to form concentrated hydrogen fluoride includes pressure swing distillation.

4. The process of claim 2, wherein the concentrated hydrogen fluoride is anhydrous hydrogen fluoride.

5. The process of claim 1, wherein a concentration of the ammonium fluorosulfate in the ammonium fluorosulfate byproduct is from 50 wt. % to 99.9 wt. % of the ammonium fluorosulfate byproduct.

6. The process of claim 1, wherein the process is an integrated process further comprising:
   providing a solution comprising fluorosulfonic acid and urea;
   reacting the solution comprising fluorosulfonic acid and urea at a reaction temperature from 80° C. to about 170° C. to produce a crude product including bis(fluorosulfonyl) imide, fluorosulfonic acid, and ammonium fluorosulfate;
   separating the ammonium fluorosulfate from the crude product to produce an intermediate product having a greater concentration of bis(fluorosulfonyl) imide than the crude product and the ammonium fluorosulfate byproduct, the ammonium fluorosulfate byproduct having a greater concentration of ammonium fluorosulfate than the crude product; and
   separating the intermediate product into a concentrated product and a recycle product, the concentrated product including a higher concentration of bis(fluorosulfonyl) imide than the recycle product.

7. A process for treating an ammonium fluorosulfate byproduct, the process comprising:
   providing an ammonium fluorosulfate byproduct including primarily ammonium fluorosulfate and lesser amounts of fluorosulfonic acid and bis(fluorosulfonyl) imide;
   mixing the ammonium fluorosulfate byproduct with water and a base; and reacting the mixture of the ammonium fluorosulfate byproduct with the water and the base at a hydrolysis reaction temperature to hydrolyze and neutralize the ammonium fluorosulfate, the fluorosulfonic acid and the bis(fluorosulfonyl) imide to form a mixture comprising a fluoride, a sulfate and ammonium bisulfate.

8. The process of claim 7, wherein reacting the mixture of the ammonium fluorosulfate byproduct with the water and the base also forms ammonia.

9. The process of claim 7, wherein the base includes calcium hydroxide, the fluoride formed includes calcium fluoride and the sulfate formed includes calcium sulfate.

10. The process of claim 7, wherein the base includes sodium hydroxide, the fluoride formed includes sodium fluoride and the sulfate formed includes sodium sulfate.

11. The process of claim 7, wherein the base includes potassium hydroxide, the fluoride formed includes potassium fluoride and the sulfate formed includes potassium sulfate.

12. The process of claim 7, wherein the base includes ammonium hydroxide, the fluoride formed includes ammonium fluoride and the sulfate formed includes ammonium sulfate.

13. The process of claim 7, wherein the ammonium fluorosulfate byproduct consists essentially of ammonium fluorosulfate, fluorosulfonic acid and bis(fluorosulfonyl) imide.

14. The process of claim 7, wherein the process is an integrated process further comprising:
  providing a solution comprising fluorosulfonic acid and urea;
  reacting the solution comprising fluorosulfonic acid and urea at a reaction temperature from 80° C. to about 170° C. to produce a crude product including bis(fluorosulfonyl) imide, fluorosulfonic acid, and ammonium fluorosulfate;
  separating the ammonium fluorosulfate from the crude product to produce an intermediate product having a greater concentration of bis(fluorosulfonyl) imide than the crude product and the ammonium fluorosulfate byproduct, the ammonium fluorosulfate byproduct having a greater concentration of ammonium fluorosulfate than the crude product; and
  separating the intermediate product into a concentrated product and a recycle product, the concentrated product including a higher concentration of bis(fluorosulfonyl) imide than the recycle product.

\* \* \* \* \*